United States Patent
Aoki (10) Patent No.: US 11,528,639 B2
(45) Date of Patent: Dec. 13, 2022

(54) SYSTEM AND NON-TRANSITORY COMPUTER READABLE MEDIUM

(71) Applicant: FUJIFILM BUSINESS INNOVATION CORP., Tokyo (JP)

(72) Inventor: Teppei Aoki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 453 days.

(21) Appl. No.: 16/584,276

(22) Filed: Sep. 26, 2019

(65) Prior Publication Data
US 2020/0367100 A1 Nov. 19, 2020

(30) Foreign Application Priority Data
May 17, 2019 (JP) .............................. JP2019-093641

(51) Int. Cl.
| | | |
|---|---|---|
| H04W 28/06 | (2009.01) | |
| H04L 69/324 | (2022.01) | |
| H04L 67/12 | (2022.01) | |
| H04W 88/06 | (2009.01) | |

(52) U.S. Cl.
CPC ............ *H04W 28/06* (2013.01); *H04L 67/12* (2013.01); *H04L 69/324* (2013.01); *H04W 88/06* (2013.01)

(58) Field of Classification Search
CPC ....... H04W 28/06; H04W 88/06; H04W 4/70; H04W 36/0011; H04W 36/0022; H04W 36/0033; H04W 88/10; H04L 67/12; H04L 69/324
See application file for complete search history.

(56) References Cited

U.S. PATENT DOCUMENTS

| | | | | |
|---|---|---|---|---|
| 8,891,588 | B1* | 11/2014 | Hui ....................... | H04L 45/306 375/133 |
| 8,964,611 | B2* | 2/2015 | Das ................... | H04W 52/0229 455/343.2 |
| 10,736,011 | B2* | 8/2020 | Nagasaka ......... | H04W 72/0413 |
| 10,769,909 | B1* | 9/2020 | Modestine ............. | G06V 20/52 |
| 2005/0048963 | A1* | 3/2005 | Kubler .................. | H04W 16/06 455/448 |
| 2006/0068777 | A1* | 3/2006 | Sadowsky ............. | H04W 88/10 455/427 |
| 2011/0010166 | A1* | 1/2011 | Izukawa ............... | H04W 88/06 704/201 |

(Continued)

FOREIGN PATENT DOCUMENTS

JP    2018-093465 A    6/2018

*Primary Examiner* — Jean A Gelin
(74) *Attorney, Agent, or Firm* — Oliff PLC (57) ABSTRACT

A system includes an IP communication unit that communicates by IP communication, a non-IP communication unit that communicates by non-IP communication for which a transmittable data size is smaller than the transmittable data size for IP communication, and a controller that controls a switching between communication by the IP communication unit and communication by the non-IP communication unit, such that communication is performed by non-IP communication in a case in which a size of data to transmit is equal to or less than a predetermined first size, and communication is performed by IP communication in the case in which the size of the data to transmit is greater than the first size.

9 Claims, 8 Drawing Sheets

(56) References Cited

U.S. PATENT DOCUMENTS

| | | | | |
|---|---|---|---|---|
| 2011/0105028 | A1* | 5/2011 | Yu | H04W 48/18 |
| | | | | 455/67.11 |
| 2013/0052955 | A1* | 2/2013 | Tamura | H04W 76/15 |
| | | | | 455/41.2 |
| 2013/0070745 | A1* | 3/2013 | Nixon | H04L 45/74 |
| | | | | 370/328 |
| 2014/0241322 | A1* | 8/2014 | Kim | H04W 36/0016 |
| | | | | 370/331 |
| 2014/0268224 | A1* | 9/2014 | Inoue | G06F 3/1236 |
| | | | | 358/1.15 |
| 2015/0023341 | A1* | 1/2015 | Zhao | H04W 48/16 |
| | | | | 370/338 |
| 2015/0109919 | A1* | 4/2015 | Rhee | H04L 47/193 |
| | | | | 370/230 |
| 2016/0269296 | A1* | 9/2016 | Abraham | H04W 28/065 |
| 2017/0027016 | A1* | 1/2017 | Suga | H04W 76/16 |
| 2018/0248808 | A1* | 8/2018 | Sugimoto | H04L 47/27 |
| 2019/0028337 | A1* | 1/2019 | Ryu | H04W 8/02 |
| 2019/0227895 | A1* | 7/2019 | Noguchi | G06F 11/3003 |
| 2020/0037226 | A1* | 1/2020 | Magadevan | H04W 4/70 |
| 2021/0286569 | A1* | 9/2021 | Tsunekawa | H04N 1/00214 |

\* cited by examiner

SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-093641 filed May 17, 2019.

BACKGROUND

(i) Technical Field

The present disclosure relates to a system and a non-transitory computer readable medium.

(ii) Related Art

In recent years, attention has been focused on low power wide area (LPWA) communication as a standard communication method for IoT terminals. Additionally, Japanese Unexamined Patent Application Publication No. 2018-93465 describes the following technology as a backup power supply system enabling simplification of the configuration of an LPWA communication system. Namely, there is a communication system provided with a backup power supply system as a power supply, the backup power supply system including a battery, a battery information detection unit, an output control unit for controlling the output of the battery, a power supply switching unit, and an LPWA terminal communication unit for transmitting battery level information. The communication system is provided with an LPWA communication unit for communicating with an LPWA terminal group by LPWA communication, and a mobile network communication unit.

SUMMARY

If a communication method capable of transmitting a large amount of data at once is used even though the size of the data to transmit is small, the communication costs are increased needlessly. For this reason, to reduce the communication costs, it is conceivable to use a communication method capable of transmitting less data at once than the channel capacity of IP communication. However, in the case of using only the communication method that is capable of transmitting a smaller amount of data at once, there is a risk of being unable to transmit data when there is a large amount of data to transmit.

Aspects of non-limiting embodiments of the present disclosure relate to transmitting data at the same level of reliability as IP communication, irrespectively of the size of the data to be transmitted, while also reducing communication costs compared to the case of using IP communication.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a system including an IP communication unit that communicates by IP communication, a non-IP communication unit that communicates by non-IP communication for which a transmittable data size is smaller than the transmittable data size for IP communication, and a controller that controls a switching between communication by the IP communication unit and communication by the non-IP communication unit, such that communication is performed by non-IP communication in a case in which a size of data to transmit is equal to or less than a predetermined first size, and communication is performed by IP communication in the case in which the size of the data to transmit is greater than the first size.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments will be described in detail and with reference to the attached drawings.

First Exemplary Embodiment

Figure 1:
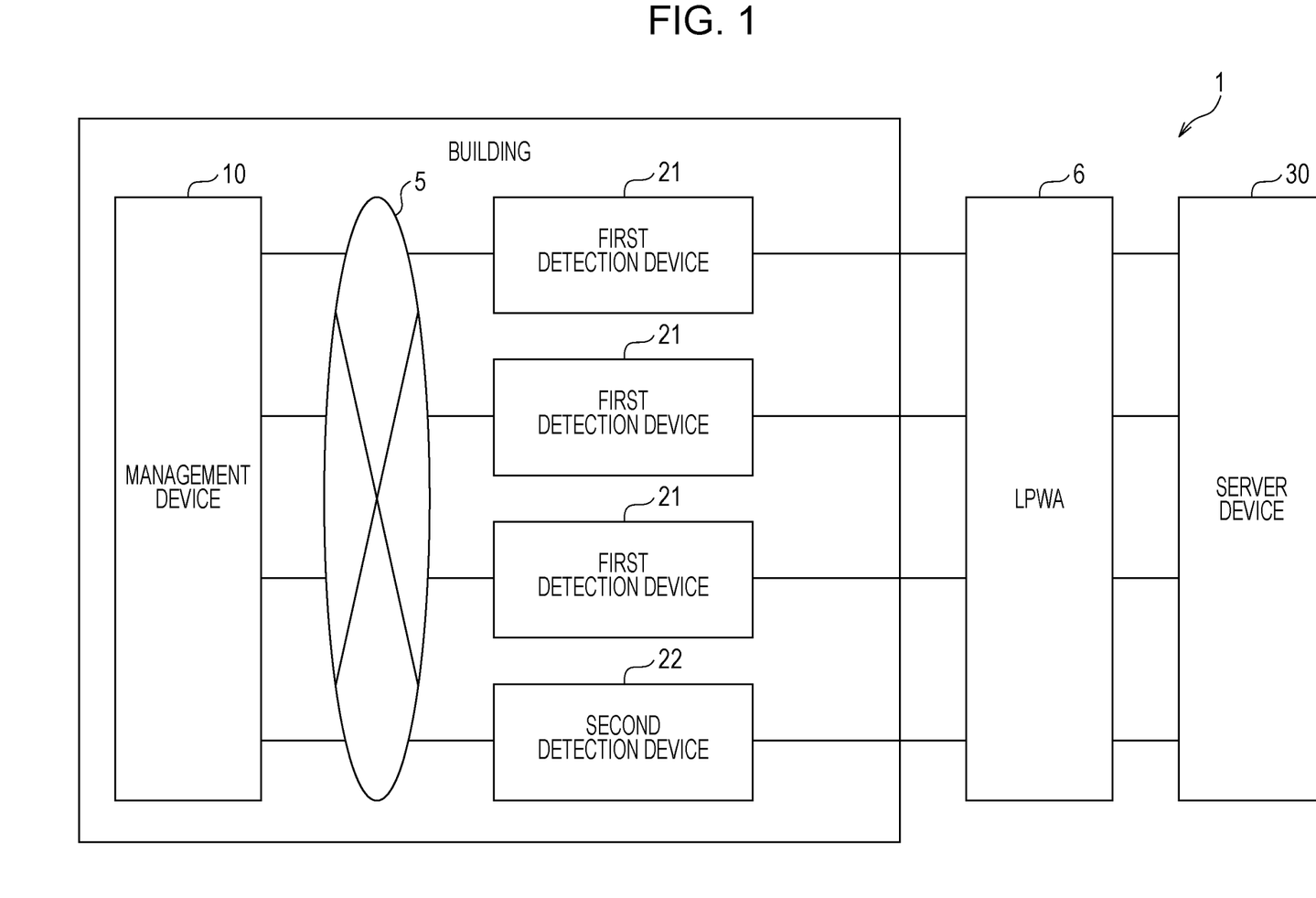
FIG. 1 is a diagram illustrating an example of a schematic configuration of a system according to a first exemplary embodiment.

FIG. 1 is a diagram illustrating an example of a schematic configuration of a system 1 according to a first exemplary embodiment.

The system 1 according to the first exemplary embodiment is provided with first detection devices 21 and a second detection device 22 that detect a nearby event, a management device 10 that manages the operations of the first detection devices 21 and the second detection device 22, and a server device 30 that receives data transmitted from the first detection devices 21 and the second detection device 22. The system 1 exemplified in FIG. 1 illustrates an example of a system that guards the interior of a building with three first detection devices 21 and one second detection device 22. However, the numbers of the first detection devices 21 and the second detection device 22 are not limited to three and one, respectively.

The first detection devices 21 and the second detection device 22 are capable of communicating with the management device 10 over a network 5. The network 5 is not particularly limited insofar as the network 5 is a communication network used for data communication between devices, and may be the Internet, a wide area network (WAN), or a local area network (LAN) for example. The communication channel used for data communication may be wired, wireless, or a combination of the two. Also, it may be configured such that a relay device such as a gateway device or a router is used to connect each device through multiple networks and communication channels.

The first detection devices 21 as well as the second detection device 22 and the server device 30 are capable of communicating with each other through a low-power wide-area (LPWA) network (hereinafter referred to as "LPWA" in some cases) 6. The LPWA 6 is capable of long-range data communication and feature low power consumption and low cost compared to protocols such as Wi-Fi, Long Term Evolution (LTE) and Bluetooth (registered trademark), for example. Accordingly, the LPWA 6 is a network suited to communication with IoT devices. The communication standard used to achieve the LPWA 6 may be Narrowband IoT (NB-IoT) for example.

Note that the first detection devices 21 as well as the second detection device 22 and the management device 10 may also be capable of communicating through the LPWA 6.

Figure 2A:
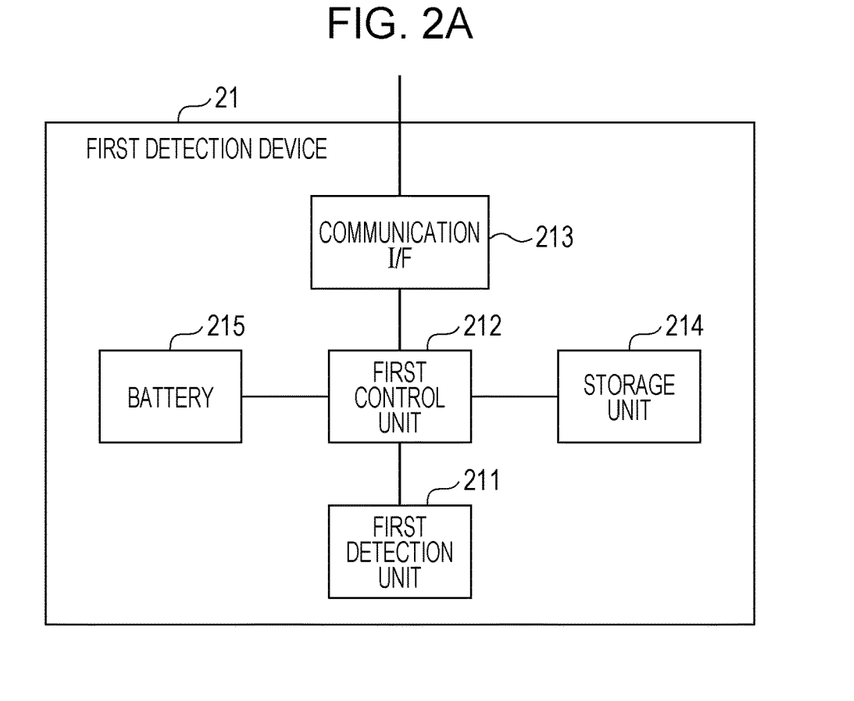
FIG. 2A is a diagram illustrating an example of a schematic configuration of a first detection device.
Figure 2B:
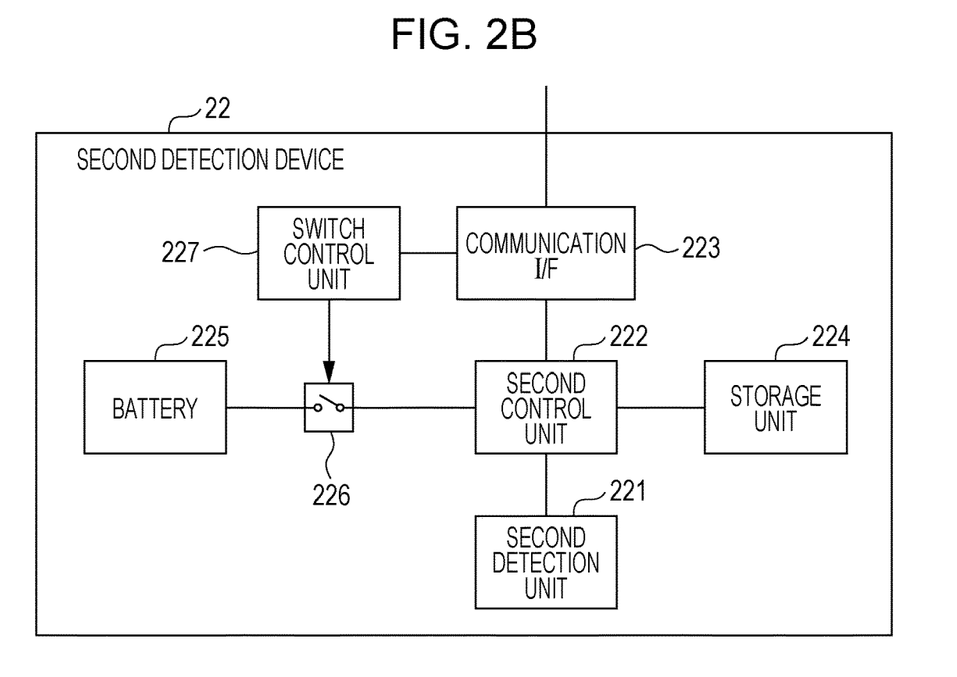
FIG. 2B is a diagram illustrating an example of a schematic configuration of a second detection device.

FIG. 2A is a diagram illustrating an example of a schematic configuration of one of the first detection devices 21. FIG. 2B is a diagram illustrating an example of a schematic configuration of the second detection device 22.

[Configuration of First Detection Devices 21]

Each first detection device 21 includes a first detection unit 211 that acts as one example of a first detector that detects a nearby event, a first control unit 212 that transmits information created using data related to an event detected by the first detection unit 211 to the server device 30, a communication I/F 213, a storage unit 214, and a battery 215.

The first detection unit 211 may be a monitoring camera that takes images of a monitoring region. In the following description, the first detection unit 211 is assumed to be a monitoring camera in some cases.

The first control unit 212 includes a central processing unit (CPU) (not illustrated), random access memory (RAM) (not illustrated) used as working memory of the CPU and the like, and read-only memory (ROM) (not illustrated) that stores various programs executed by the CPU and the like. The first control unit 212 acquires an image taken by the first detection unit 211, and from the acquired image, determines whether or not an abnormality has occurred, such as the presence of an intruder for example. Subsequently, the first control unit 212 transmits, through the communication I/F 213, the detection result of whether or not an abnormality has occurred to the server device 30 through the LPWA 6 periodically at a predetermined frequency. When transmitting the detection result, the first control unit 212 references information about the destination to which to send the detection result, namely the server device 30, stored in the storage unit 214.

The first control unit 212 uses technology called non-IP data delivery (NIDD), which transmits data without the use of the IP protocol, to transmit data to the server device 30 through the LPWA 6. Herein, the communication via the LPWA 6 includes a "control plane (C-plane)" used for control and a "user plane (U-plane)" containing speech data and packet data. The same also applies to the LTE-M1 and NB-IoT communication standards designed for IoT. For example, in the case of ordinary NB-IoT, control signals are placed in the control plane while packet data is placed in the user plane. On the other hand, NIDD is a technology that communicates according to NB-IoT communication by embedding the content to be communicated into the control plane and not using the user plane. In the following, communication including the control plane and the user plane, like ordinary NB-IoT, will be referred to as "IP communication", whereas communication including the control plane and not using the user plane, like NIDD, will be referred to as "non-IP communication" in some cases. Because non-IP communication does not use the user plane, small amounts of data may be transmitted efficiently compared to IP communication.

As a detection result, the first control unit 212 transmits an abnormal signal indicating that an abnormality has occurred or a normal signal indicating that an abnormality has not occurred as determined using an image taken by the first detection unit 211 to the server device 30 by non-IP communication. Because the data size of an image taken by the first detection unit 211 exceeds the size of data that is transmittable by non-IP communication, the first control unit 212 transmits the abnormal signal or the normal signal without transmitting the data of the image taken by the first detection unit 211. Hereinafter, the maximum size of data that is transmittable by non-IP communication will be referred to as the "first size" in some cases.

The first control unit 212 transmits the detection result together with data including the International Mobile Equipment Identity (hereinafter referred to as the "IMEI" in some cases) of the first detection device 21 to the server device 30. Information about the server device 30 to transmit to is stored in the storage unit 214.

The communication I/F 213 includes a function capable of transmitting and receiving data with the server device 30 by non-IP communication, and a function capable of transmitting and receiving data with the management device 10 by IP communication. Additionally, the communication I/F 213 may also be capable of transmitting and receiving data with the management device 10 by non-IP communication.

The storage unit 214 is a storage device such as semiconductor memory, and stores information about the server device 30 to which to send the detection result and the management device 10.

[Configuration of Second Detection Device 22]

The second detection device 22 includes a second detection unit 221 that acts as one example of a second detector that detects a nearby event, a second control unit 222 that transmits information created using data related to an event detected by the second detection unit 221 to the server device 30, a communication I/F 223, and a storage unit 224.

Additionally, the second detection device 22 is provided with a battery 225 that supplies power to each unit and a switch 226 for switching the supply of power from the battery 225 to the second control unit 222 on and off. Also, the second detection device 22 is provided with a switch control unit 227 that controls the switching on and off of the switch 226 on the basis of data acquired through the communication I/F 223.

The second detection unit 221 may be a monitoring camera that takes images of a monitoring region. In the following description, the second detection unit 221 is assumed to be a monitoring camera in some cases. The second detection unit 221 is capable of taking images of higher resolution than the first detection unit 211 of the first detection devices 21. Also, the image-taking range of the second detection unit 221 is wider than the image-taking range of the first detection unit 211.

The second control unit 222 includes a CPU (not illustrated), RAM (not illustrated), and ROM (not illustrated). The second control unit 222 acquires an image taken by the second detection unit 221, and in addition, transmits the taken image to the server device 30 through the LPWA 6 as a detection result. When transmitting the detection result, the second control unit 222 references information about the destination to which to send the detection result, namely the server device 30, stored in the storage unit 224.

Because the data size of the image taken by the second detection unit 221 exceeds the size of data that is transmittable by non-IP communication, the second control unit 222 transmits the detection result to the server device 30 by IP communication.

The second control unit 222 transmits the detection result together with data including the IMEI of the second detection device 22 to the server device 30. Information about the server device 30 to transmit to is stored in the storage unit 224.

The communication I/F 223 includes a function capable of transmitting and receiving data with the server device 30 by IP communication, and a function capable of transmitting and receiving data with the management device 10 by IP communication. However, the communication I/F 223 may also be capable of transmitting and receiving data with the server device 30 and the management device 10 by non-IP communication.

The storage unit 224 is a storage device such as semiconductor memory, and stores information about the server device 30 to which to send the detection result.

The switch control unit 227 includes a CPU (not illustrated), RAM (not illustrated), and ROM (not illustrated). In the case in which the switch control unit 227 receives control information described later from the image processing device 10 through the communication I/F 223, namely, control information for switching on the switch 226 and transmitting the image taken by the second detection unit 221 to the server device 30, the switch control unit 227 switches on the switch 226.

As described above, the image-taking range of the second detection unit 221 of the second detection device 22 is wider than the image-taking range of the first detection unit 211 of the first detection devices 21, or the power consumption when the first detection devices 21 transmit a detection result is less than the power consumption when the second detection device 22 transmits a detection result. For this reason, in the system 1, the number of the first detection devices 21 is greater than the number of second detection devices 22.

[Configuration of Server Device 30]

Figure 3:
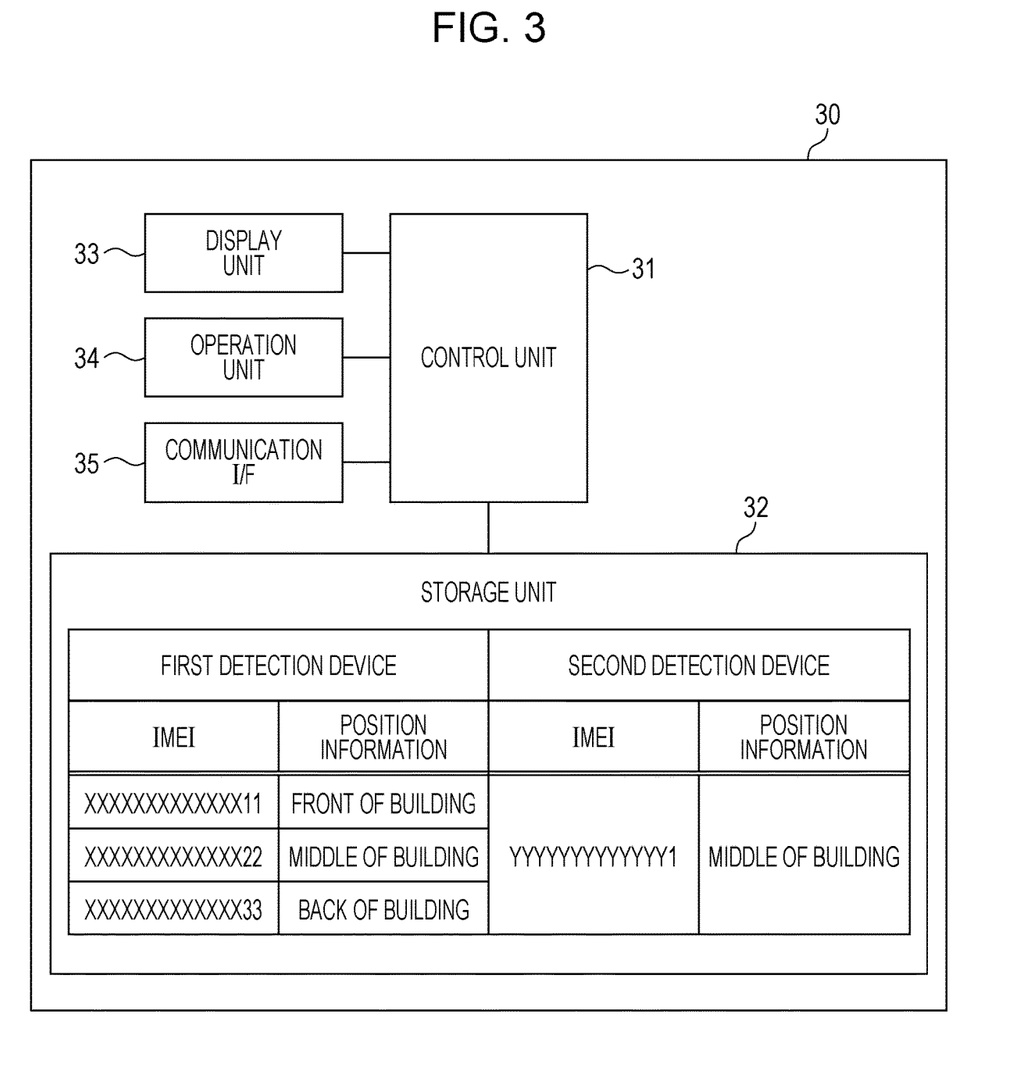
FIG. 3 is a diagram illustrating an example of a schematic configuration of a server device according to the first exemplary embodiment.

FIG. 3 is a diagram illustrating an example of a schematic configuration of the server device 30 according to the first exemplary embodiment.

As illustrated in FIG. 3, the server device 30 is provided with a control unit 31 that controls the device overall, a storage unit 32 used to store data and the like, a display unit 33 used to display operation reception screens and images, an operation unit 34 that receives input operations from a user, and a communication I/F 35 used to communicate with external devices.

The control unit 31 includes a CPU (not illustrated), RAM (not illustrated), and ROM (not illustrated). Additionally, the control unit 31 controls the operations of the server device 30 overall by having the CPU load a program stored in the ROM into the RAM and execute the program.

The control unit 31 receives and analyzes the detection results transmitted from the first detection devices 21 and the second detection device 22. Subsequently, in the case where, as a result of the analysis, the control unit 31 determines that a suspicious intruder is present inside the building, for example, the control unit 31 notifies a security company that guards the building and the owner of the building about the suspicious intruder. The notification method may be email transmission for example.

The storage unit 32 may be a storage device such as a hard disk drive (HDD). The storage unit 32 may also be semiconductor memory. The storage unit 32 respectively stores information about the positions where the first detection devices 21 are installed, in association with the IMEIs of the first detection devices 21. FIG. 3 illustrates an example of a case in which three first detection devices 21 are set up in the front of the building, the middle of the building, and the back of the building, respectively. Also, the storage unit 32 stores information about the position where the second detection device 22 is installed (in FIG. 3, in the middle of the building), in association with the IMEI of the second detection device 22. Note that because the first detection devices 21 and the second detection device 22 are different devices, the IMEIs are different.

The display unit 33 is a display device that displays still images, moving images, and the like. The display unit 33 may be a liquid crystal display or an organic electroluminescence (EL) display, for example.

The operation unit 34 is an input device that receives operations from the user. The operation unit 34 may be one or more buttons and switches, a touch panel, and the like.

The communication I/F 35 includes a function capable of transmitting and receiving data with the first detection devices 21 through the LPWA 6 by non-IP communication, and a function capable of transmitting and receiving data with the second detection device 22 by IP communication. However, the communication I/F 35 may also be capable of transmitting and receiving data with the second detection device 22 by non-IP communication.

Note that a program executed by the CPU of the control unit 31 may be provided in a recorded state on a computer readable recording medium, such as a magnetic recording medium (such as magnetic tape or a magnetic disk), an optical recording medium (such as an optical disc), a magneto-optical recording medium, or semiconductor memory. In addition, such a program may also be downloaded to the server device 30 by using a communication medium such as the Internet.

[Configuration of Management Device 10]

Figure 4:
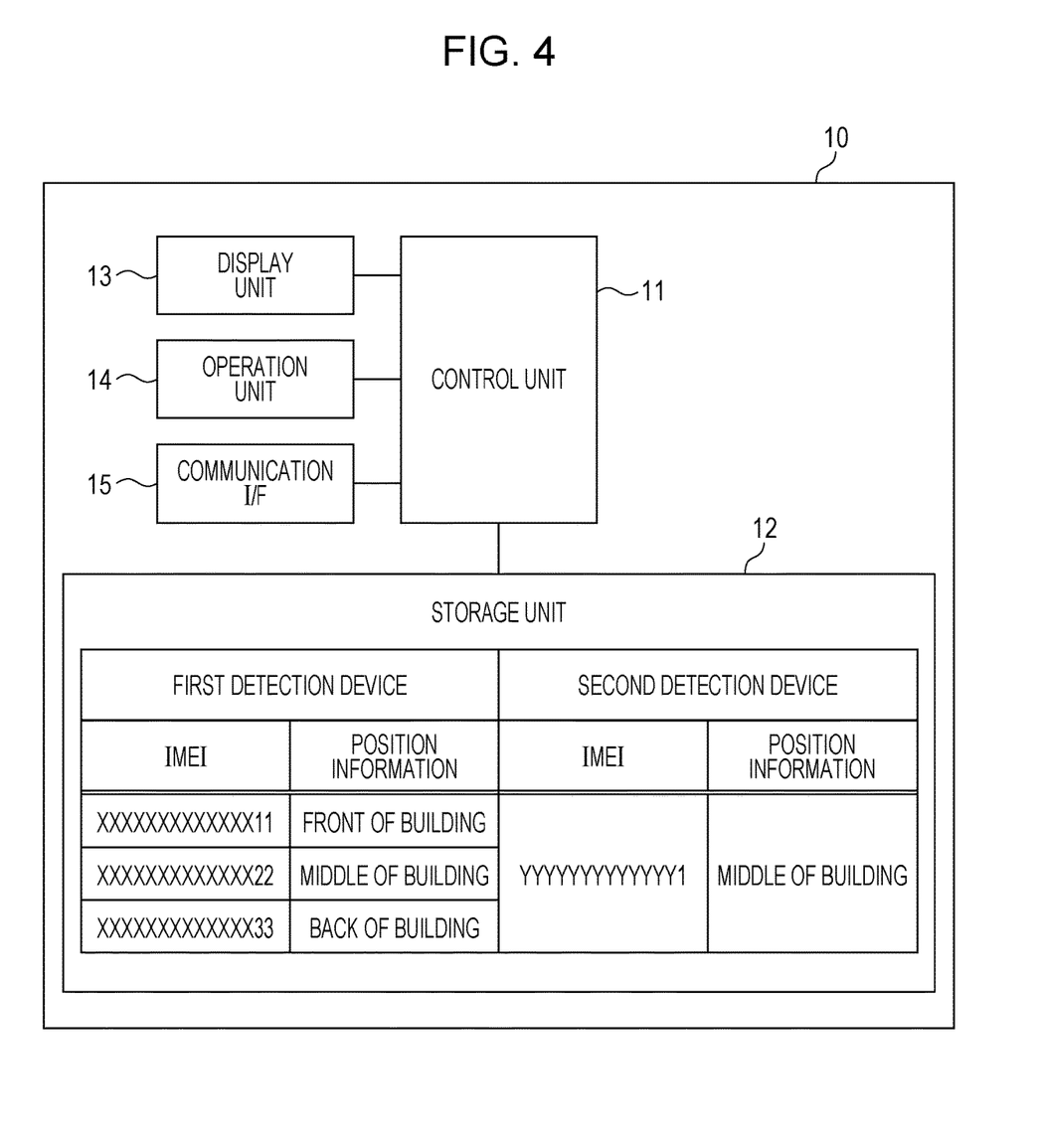
FIG. 4 is a diagram illustrating an example of a schematic configuration of a management device according to the first exemplary embodiment.

FIG. 4 is a diagram illustrating an example of a schematic configuration of the management device 10 according to the first exemplary embodiment.

As illustrated in FIG. 4, the management device 10 is provided with a control unit 11 that controls the device overall, a storage unit 12 used to store data and the like, a display unit 13 used to display operation reception screens and images, an operation unit 14 that receives input operations from a user, and a communication I/F 15 used to communicate with external devices.

The storage unit 12 may be a storage device such as a hard disk drive (HDD). The storage unit 12 may also be semiconductor memory.

The storage unit 12 stores information about the first detection devices 21 and the second detection device 22. Namely, the storage unit 12 respectively stores information about the positions where the first detection devices 21 are installed, in association with the IMEIs of the first detection devices 21. Also, the storage unit 12 stores information about the position where the second detection device 22 is installed, in association with the IMEI of the second detection device 22. Also, the storage unit 12 stores a record of detections results transmitted to the server device 30 by the first detection devices 21 by non-IP communication, and a record of images and the like transmitted to the server device 30 by the second detection device 22 by IP communication.

The display unit 13 may be a liquid crystal display or an organic electroluminescence (EL) display, for example.

The operation unit 14 is an input device that receives operations from the user. The operation unit 14 may be a touch panel.

The communication I/F 15 includes a function capable of transmitting and receiving data with the first detection devices 21 and the second detection device 22 over the network 5. However, the communication I/F 15 may also include a function capable of transmitting and receiving data with the first detection devices 21 and the second detection device 22 through the LPWA 6.

The control unit 11 includes a CPU (not illustrated), RAM (not illustrated), and ROM (not illustrated). Also, the control unit 11 receives and analyzes detection results transmitted from the first detection devices 21, and generates control information for controlling the second detection device 22. Namely, in the case in which the detection result transmitted from one of the first detection devices 21 is an abnormal signal, the control unit 11 activates the second detection device 22 and causes the second detection device 22 to transmit an image taken by the second detection unit 221 to the server device 30. With this arrangement, after an abnormal signal is transmitted from one of the first detection devices 21, an image taken by the second detection unit 221 is transmitted from the second detection device 22 to the server device 30.

On the other hand, in the case in which the detection result transmitted from each of the first detection devices 21 is a normal signal, the control unit 11 does not activate the second detection device 22. With this arrangement, normal signals are periodically transmitted from the first detection devices 21 to the server device 30.

Figure 5:
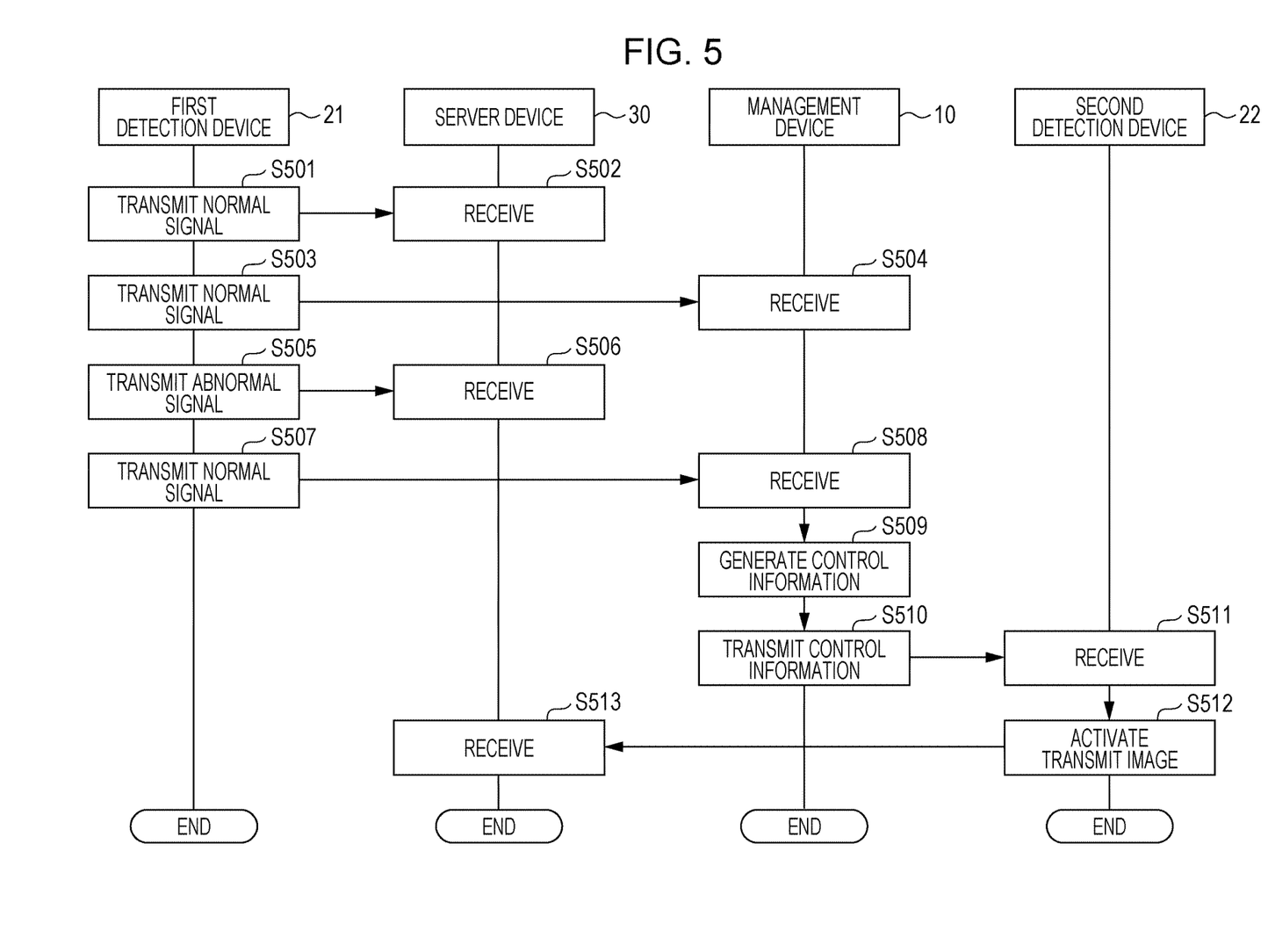
FIG. 5 is one example of a sequence diagram illustrating a processing sequence by the system according to the first exemplary embodiment.

FIG. 5 is one example of a sequence diagram illustrating a processing sequence by the system 1 according to the first exemplary embodiment.

In the system 1 configured as above, each first detection device 21 periodically transmits a detection result to the server device 30 and the management device 10. For example, in the case in which one of the first detection devices 21 has not detected the occurrence of an abnormality, the first detection device 21 transmits a normal signal indicating that an abnormality has not occurred to the server device 30 through the LPWA 6 by non-IP communication (S501). The server device 30 receives the normal signal transmitted from the first detection device 21 (S502). Also, the first detection device 21 transmits the normal signal to the management device 10 over the network 5 (S503). The management device 10 receives the normal signal transmitted from the first detection device 21 (S504). In the case in which the received signal is a normal signal, the server device 30 and the management device 10 do not perform any special process.

In the case in which one of the first detection devices 21 detects the occurrence of an abnormality, the first detection device 21 transmits an abnormal signal indicating that an abnormality has occurred to the server device 30 through the LPWA 6 by non-IP communication (S505). The server device 30 receives the abnormal signal transmitted from the first detection device 21 (S506). Also, the first detection device 21 transmits the abnormal signal to the management device 10 over the network 5 (S507). The management device 10 receives the abnormal signal transmitted from the first detection device 21 (S508).

After receiving the abnormal signal, the management device 10 generates control information for activating the second detection device 22, causing the second detection unit 221 to take an image, and causing the taken image to be transmitted to the server device 30 (S509). Subsequently, the management device 10 transmits the generated control information to the second detection device 22 (S510).

In the second detection device 22, after the control information transmitted from the management device 10 is received (S511), the switch 226 is switched on to start supplying power to the second control unit 222, and after that, an image is taken by the second detection unit 221 and the taken image is transmitted to the server device 30 (S512). In the server device 30, after the image transmitted by the second detection device 22 is received (S513), in the case of determining that a suspicious intruder is inside the building, for example, a predetermined process such as notifying the security company that guards the building and the owner of the building about the suspicious intruder is performed.

As described above, in the system 1, the first control unit 212 of each first detection device 21 transmits the detection result from the first detection unit 211 to the server device 30 through the LPWA 6 by non-IP communication. Additionally, in the case in which one of the first detection devices 21 detects that an abnormality has occurred, the second detection device 22 is turned on and the second control unit 222 transmits an image taken by the second detection unit 221 to the server device 30 according to control information from the management device 10.

In this way, the system 1 is provided with the second control unit 222 that acts as one example of an IP communication unit that communicates by IP communication, and the first control unit 212 that acts as one example of a non-IP communication unit that communicates by non-IP communication for which the transmittable data size is smaller than the transmittable data size for IP communication. Also, the system 1 is provided with the management device 10 that acts as one example of a controller that controls the switching between communication by the IP communication unit and communication by the non-IP communication unit, such that communication is performed by non-IP communication in the case in which the size of the data to transmit is equal to or less than a predetermined first size, and communication is performed by IP communication in the case in which the size of the data to transmit is greater than the first size.

More specifically, in the system 1, because the images taken by the first detection unit 211 of the first detection devices 21 are larger than the first size which is the size of data transmittable by non-IP communication, the management device 10 causes the communication with the server device 30 to be performed by non-IP communication while the first detection devices 21 are continuing to send normal signals. On the other hand, in the case in which one of the first detection devices 21 sends an abnormal signal, if the first control unit 212 attempts to transmit the image taken by the first detection unit 211 by non-IP communication, the image data will be larger than the first size and the transmission may fail. Accordingly, the management device 10 activates the second detection device 22 and causes the second detection device 22 to transmit data related to the event detected by the second detection unit 221, namely the image taken by the second detection unit 221, to the server device 30.

According to the system 1 configured as above, because the first detection devices 21 transmit detection results by non-IP communication, the power consumption for transmitting the detection results is reduced and communication costs are also reduced compared to the case in which the first detection devices 21 transmit the detection results by IP communication. Additionally, when analyzing an abnormality in cases such as when one of the first detection devices 21 has detected the occurrence of an abnormality, the second detection device 22 is activated and an image taken by the second detection unit 221 is transmitted to the server device 30 by IP communication. Therefore, even if there is a large amount of data involved in analyzing the abnormality, the data is transmitted more reliably than in the case of transmitting the data by non-IP communication. Also, because the data is transmitted through the LPWA 6, it becomes easier to extend the communicable range to every corner of the building compared to Wi-Fi for example. As a result, even if one of the first detection devices 21 is installed in a corner of the building, the detection result from the first detection device 21 is reliably transmitted to the server device 30. Therefore, the number of server devices 30 is reduced with respect to the area or the number of buildings to be monitored.

Also, according to the system 1, the first detection devices 21 and the second detection device 22 are devices having respectively different IMEIs. Therefore, there is a higher degree of freedom when choosing which devices to include in the system 1 compared to the case in which the first detection device 21 and the second detection device 22 are integrated into a single device having a single IMEI. Also, it becomes possible to easily replace previous devices that transmit detection results by IP communication with the first detection devices 21 that transmit detection results by non-IP communication. This replacement is possible without replacing the second detection device 22.

Note that the second detection device 22 described above is a device integrating the second detection unit 221, the second control unit 222, the communication I/F 223, the storage unit 224, and the like, but these units do not have to be integrated. For example, the second detection unit 221 that detects a nearby event may be configured separately from a transmission device that integrates the second control unit 222, the communication I/F 223, the storage unit 224, the battery 225, the switch 226, and the switch control unit 227. Additionally, when the second control unit 222 of the transmission device receives control information from the management device 10, it is sufficient to cause the second detection unit 221 to take an image, acquire the image taken by the second detection unit 221 from the second detection unit 221, and transmit the acquired image to the server device 30.

Second Exemplary Embodiment

Figure 6:
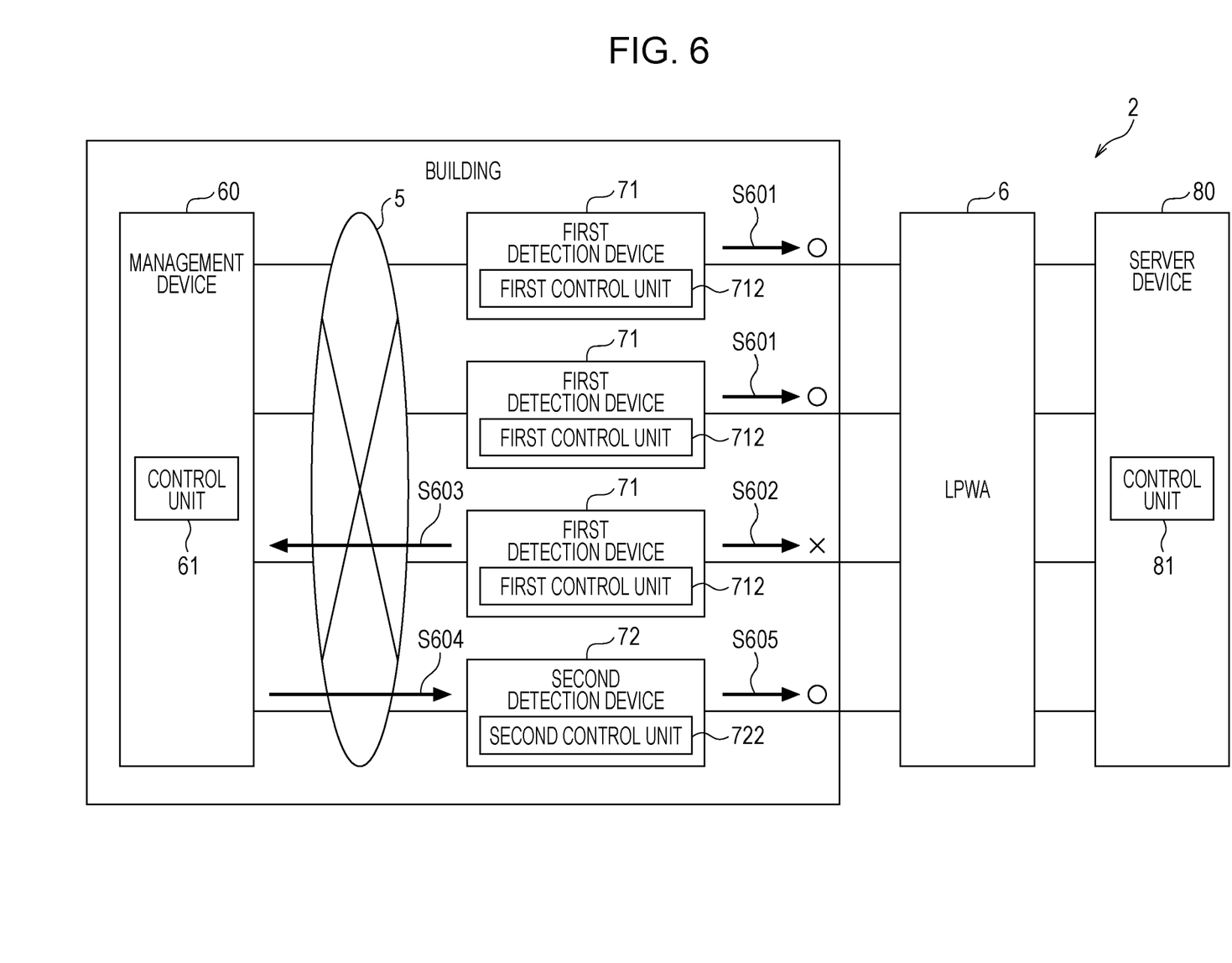
FIG. 6 is a diagram illustrating an example of a schematic configuration of a system according to a second exemplary embodiment.

FIG. 6 is a diagram illustrating an example of a schematic configuration of a system 2 according to a second exemplary embodiment.

Hereinafter, the points regarding the system 2 according to the second exemplary embodiment that are different from the system 1 according to the first exemplary embodiment mainly will be described. Functions which are the same in the systems 1 and 2 will be denoted with the same signs, and a detailed description will be omitted.

The system 2 according to the second exemplary embodiment is provided with first detection devices 71 that correspond to the first detection devices 21 of the system 1, a second detection device 72 that corresponds to the second detection device 22 of the system 1, a management device 60 that manages the operations of the first detection devices 71 and the second detection device 72, and a server device 80 that receives data transmitted from the first detection devices 71 and the second detection device 72.

The management device 60 is provided with a control unit 61 that corresponds to the control unit 11, the storage unit 12, the display unit 13, the operation unit 14, and the communication I/F 15.

Each first detection device 71 includes a first control unit 712 that corresponds to the first control unit 212, the first detection unit 211, the communication I/F 213, the storage unit 214, and the battery 215.

Each second detection device 72 includes a second control unit 722 that corresponds to the second control unit 222, the second detection unit 221, the communication I/F 223, the storage unit 224, the battery 225, the switch 226, and the switch control unit 227.

The server device 80 is provided with a control unit 81 that corresponds to the control unit 31, the storage unit 32, the display unit 33, the operation unit 34, and the communication I/F 35.

The first control unit 712 of each first detection device 71 transmits the data of an image taken by the first detection unit 211 to the server device 80 by non-IP communication periodically at a predetermined frequency (S601 in FIG. 6). Herein, the data size of the image taken by the first detection unit 211 does not always exceed the first size that is transmittable by non-IP communication. In other words, depending on the taken image, the first size may be exceeded in some cases and not exceeded in other cases. Additionally, in the case in which the data size of the image taken by the first detection unit 211 exceeds the first size and may not be transmitted successfully to the server device 80 by non-IP communication (S602), the first control unit 712 notifies the management device 60 (S603).

In the case of receiving a notification from one of the first detection devices 71 indicating that data may not be transmitted successfully to the server device 80, the management device 60 activates the second detection device (S604) and causes an image taken by the second detection unit 221 to be transmitted to the server device 80 by IP communication (S605).

Note that by setting the resolution and image-taking range of the first detection unit 211 such that the image taken by the first detection unit 211 is equal to or less than the first size transmittable by non-IP communication when an abnormality has not occurred and such that the image taken by the first detection unit 211 exceeds the first size when an abnormality has occurred, the system 2 exhibits the same effects as the effects exhibited by the system 1.

Third Exemplary Embodiment

Figure 7:
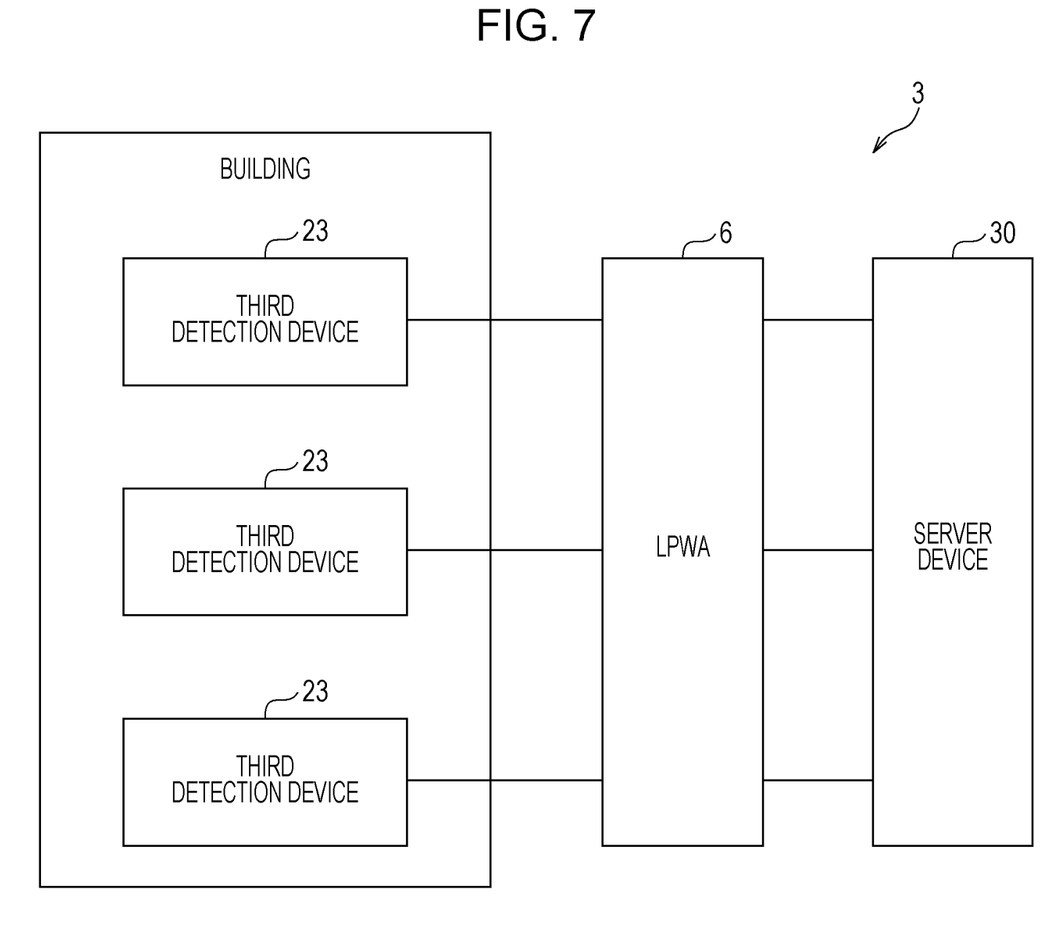
FIG. 7 is a diagram illustrating an example of a schematic configuration of a system according to a third exemplary embodiment.

FIG. 7 is a diagram illustrating an example of a schematic configuration of a system 3 according to a third exemplary embodiment.

Hereinafter, the points regarding the system 3 according to the third exemplary embodiment that are different from the system 1 according to the first exemplary embodiment mainly will be described. Functions which are the same in the systems 1 and 3 will be denoted with the same signs, and a detailed description will be omitted.

The system 3 according to the third exemplary embodiment is provided with third detection devices 23 that detect a nearby event and the server device 30 that receives data transmitted from the third detection devices 23. The system 3 exemplified in FIG. 7 illustrates an example of a system that guards the interior of a building with three third detection devices 23. However, the number of third detection devices 23 is not limited to three.

[Configuration of Third Detection Devices 23]

Figure 8:
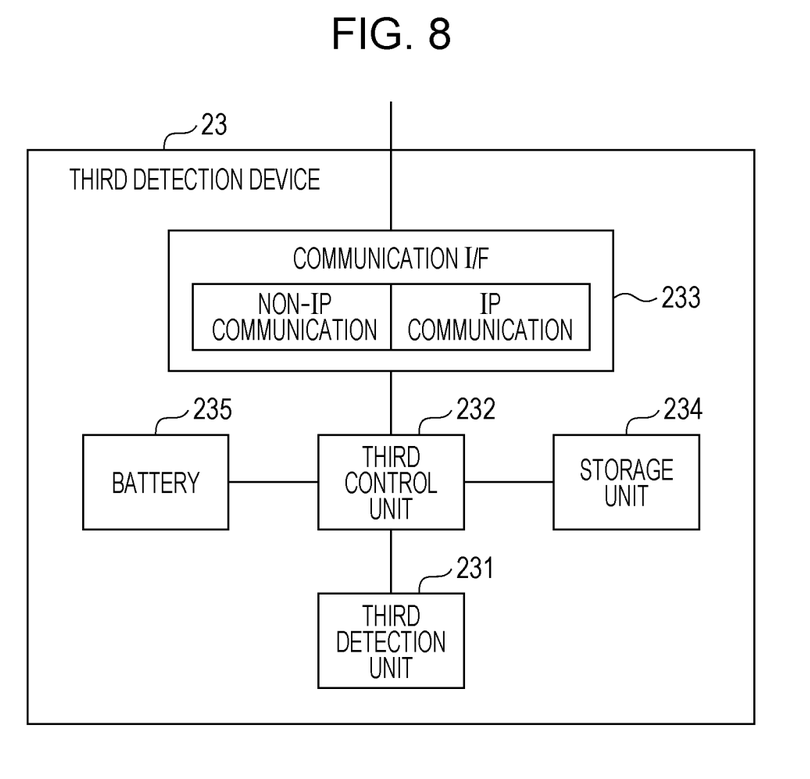
FIG. 8 is a diagram illustrating an example of a schematic configuration of a third detection device.

FIG. 8 is a diagram illustrating an example of a schematic configuration of one of the third detection devices 23.

Each third detection device 23 includes a third detection unit 231 that detects a nearby event, a third control unit 232 that transmits information created using data related to an event detected by the third detection unit 231 to the server device 30, a communication I/F 233, a storage unit 234, and a battery 235.

The third detection unit 231 may be a monitoring camera that takes images of a monitoring region. Similarly to the second detection unit 221 of the second detection device 22, the third detection unit 231 is capable of taking images of higher resolution than the first detection unit 211 of the first detection devices 21, and may have a wider image-taking range than the first detection unit 211 for example. The data of an image taken by one of the third detection units 231 is larger than the first size, that is, the data size that is transmittable by non-IP communication.

The communication I/F 233 includes a function capable of transmitting and receiving data with the server device 30 through the LPWA 6 by non-IP communication, and a function capable of transmitting and receiving data with the server device 30 by IP communication.

The storage unit 234 is a storage device such as semiconductor memory, and stores information about the server device 30 to which to send data.

The third control unit 232 includes a CPU (not illustrated), RAM (not illustrated), and ROM (not illustrated). The third control unit 232 acquires an image taken by the third detection unit 231, and from the acquired image, determines whether or not an abnormality has occurred, such as the presence of an intruder for example. Subsequently, the third control unit 232 transmits a detection result of whether or not an abnormality has occurred to the server device 30.

In the case in which an abnormality has not occurred, the third control unit 232 transmits a normal signal indicating that an abnormality has not occurred to the server device 30 by non-IP communication.

On the other hand, in the case in which an abnormality has occurred, the third control unit 232 transmits the data of an image taken by the third detection unit 231 to the server device 30 by IP communication.

In this way, the third control unit 232 functions as one example of an IP communication unit that communicates by IP communication and a non-IP communication unit that communicates by non-IP communication for which the transmittable data size is smaller than the transmittable data size for IP communication. Also, the third control unit 232 functions as one example of a controller that controls the switching between communication by IP communication and non-IP communication, such that communication is performed by non-IP communication in the case in which the size of the data to transmit is equal to or less than the first size, and communication is performed by IP communication in the case in which the size of the data to transmit is greater than the first size.

As described above, in the system 3, the third control unit 232 of each third detection device 23 transmits the normal signal to the server device 30 through the LPWA 6 by non-IP communication. Additionally, in the case of detecting that an abnormality has occurred, the third control unit 232 transmits the data of an image taken by the third detection unit 231 to the server device 30 by IP communication.

According to the system 3 configured in this way, because the third detection devices 23 transmit normal signals by non-IP communication, the power consumption for transmitting the normal signals is reduced and communication costs are also reduced compared to the case in which the third detection devices 23 transmit the normal signals by IP communication. Additionally, when analyzing an abnormality, such as in the case in which the third control unit 232 of one of the third detection devices 23 detects that an abnormality has occurred, the data of an image taken by the third detection unit 231 is transmitted to the server device 30 by IP communication. Therefore, even if there is a large amount of data involved in analyzing the abnormality, the data is transmitted more reliably than in the case of transmitting the data by non-IP communication. Also, because the data is transmitted through the LPWA 6, it becomes easier to extend the communicable range to every corner of the building compared to Wi-Fi for example. As a result, even if one of the third detection devices 23 is installed in a corner of the building, the normal signal transmitted by the third detection device 23 or the data of an image taken by the third detection unit 231 is reliably transmitted to the server device 30. Therefore, the number of server devices 30 is reduced with respect to the area or the number of buildings to be monitored.

Exemplary Modification

The third detection devices 23 switch between non-IP communication and IP communication according to the size of the data to transmit to the server device 30. The non-IP communication and the IP communication are achieved using NB-IoT for example included in 4G, the communication standard for fourth-generation mobile communication.

In cases where the third detection devices 23 are also capable of transmitting data on the basis of 5G, the communication standard for fifth-generation mobile communication, in addition to 4G, the third detection devices 23 may also be configured as follows.

Figure 9:
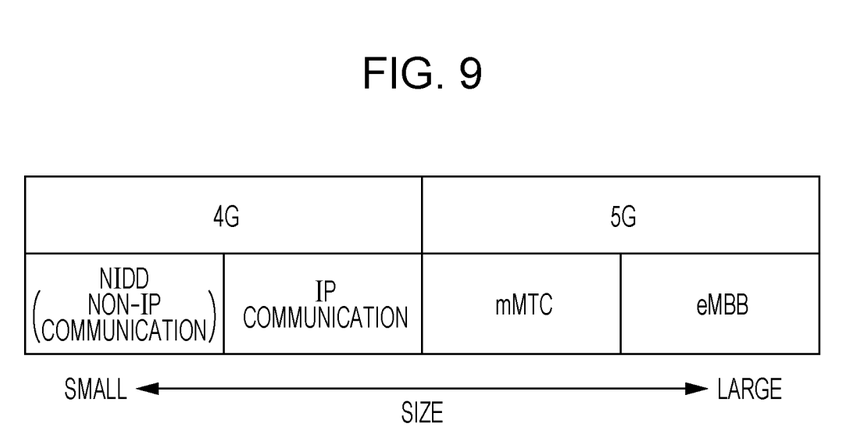
FIG. 9 is a diagram illustrating a relationship between the Fourth Generation (4G) and the Fifth Generation (5G), and the size of transmittable data.

FIG. 9 is a diagram illustrating a relationship between 4G and 5G, and the size of transmittable data.

As illustrated in FIG. 9, the size of communicable data increases in the order of 4G NIDD (non-IP communication), 4G IP communication, massive machine type communication (mMTC), which is a 5G IP communication standard, and enhanced mobile broadband (eMBB), which is a 5G IP communication standard.

In the case in which the communication I/F 233 of the third detection devices 23 according to the exemplary modification include a function capable of transmitting and receiving data with the server device 30 using 5G IP communication according to mMTC and 5G IP communication according to eMBB in addition to 4G non-IP communication and IP communication, the third control unit 232 according to the exemplary modification may switch the communication as follows.

Namely, the third control unit 232 according to the exemplary modification preferably performs communication based on the 4G standard in the case in which the size of the data to transmit to the server device 30 is equal to or less than a predetermined second size greater than the first size, and performs communication based on the 5G standard in the case in which the size is greater than the second size. Note that the second size may be the maximum size of data transmittable by 4G IP communication for example. For example, in the case in which the third detection unit 231 according to the exemplary modification is capable of taking video, if the data to transmit is a video taken by the third detection unit 231 and the data size of the video is greater than the second size, the third control unit 232 preferably performs communication based on the 5G standard.

Also, in the case in which the size of the data to transmit to the server device 30 is greater than the second size, the third control unit 232 according to the exemplary modification preferably performs communication based on the 5G mMTC standard when the size of the data is equal to or less than a predetermined third size, and performs communication based on the 5G eMBB standard when the size is greater than the third size. Note that the third size may be the maximum size of data transmittable by 5G mMTC standard for example. For example, in the case in which the third detection unit 231 according to the exemplary modification is capable of taking ultra-high-definition video such as 4K or 8K video, if the data to transmit is a video taken by the third detection unit 231 and the data size of the video is greater than the third size, the third control unit 232 preferably performs communication based on the 5G eMBB standard. In the case of performing communication based on the 5G standard, the third control unit 232 according to the exemplary modification becomes capable of transmitting and receiving larger amounts of data by increasing the strength of electric power.

Note that the communication I/F 233 does not have to include a function capable of communicating with the server device 30 using the four communication standards of 4G non-IP communication and IP communication, and 5G IP communication according to mMTC and eMBB.

For example, the communication I/F 233 may include a function capable of communicating using the three communication standards of 4G non-IP communication, and 5G IP communication according to mMTC and eMBB. In such a case, the third control unit 232 preferably performs communication based on the 5G standard in the case in which the size of the data to transmit to the server device 30 is greater than the first size.

Additionally, the communication I/F 233 may include a function capable of communicating using the three communication standards of 4G non-IP communication and IP communication, and 5G IP communication according to eMBB. In such a case, the third control unit 232 preferably performs communication entirely based on the 5G eMBB standard in the case in which the size of the data to transmit to the server device 30 is greater than the second size.

Note that although the first to third exemplary embodiments described above illustrate an example of using a monitoring camera that takes images as a detection device that detects a nearby event (for example, the first detection devices 21, the second detection device 22, and the third detection devices 23), the detection device is not particularly limited to a monitoring camera. The detection unit of the detection device may also be a temperature sensor, a humidity sensor, a barometric pressure sensor, a blood pressure sensor, a heart rate sensor, or a motion sensor that senses the presence of a human being.

The processes performed by the management device 10, the first detection devices 21, the second detection device 22, the third detection devices 23, and the server device 30 described above may be achieved by the cooperative action of software and hardware resources. In this case, the CPU of the control unit (for example, the control unit 11 of the management device 10, the first control unit 212 of the first detection devices 21, the second control unit 222 of the second detection device 22, the third control unit 232 of the third detection devices 23, or the control unit 31 of the server device 30) executes a program that realizes each function of the control unit, and causes each function to be achieved. For example, a non-transitory computer readable recording medium storing the program is provided to the control unit, and the CPU reads out the program stored in the recording medium. In this case, the program itself read out from the recording medium achieves the functions of the exemplary embodiments described above, and the program itself as well as the recording medium storing the program constitute an exemplary embodiment of the present disclosure. The recording medium for supplying such a program may be, for example, a flexible disk, a CD-ROM, a DVD-ROM, a hard disk, an optical disc, a magneto-optical disc, a CD-R, magnetic tape, a non-volatile memory card, or ROM. The program may also be downloaded over the network 5.

Additionally, a program according to an exemplary embodiment of the present disclosure causes a computer to execute a function of switching between communicating by IP communication and communicating by non-IP communication for which the transmittable data size is smaller than the transmittable data size for IP communication, such that communication is performed by IP communication in a case in which the size of the data to transmit is greater than a predetermined first size, and communication is performed by IP communication in a case in which the size of the data to transmit is equal to or less than the first size.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A system comprising:
   a first processor programmed to communicate by IP communication;
   a second processor programmed to communicate by non-IP communication for which a transmittable data size is smaller than a transmittable data size for IP communication;
   a third processor programmed to control a switching between communication by the first processor and communication by the second processor, such that communication is performed by non-IP communication in a case in which a size of data to transmit is equal to or less than a predetermined first size, and communication is performed by IP communication in the case in which the size of the data to transmit is greater than the first size;
   a first detection device including a first detector that detects a first event and the second processor that transmits data related to the first event detected by the first detector to an external device; and a second detector that detects a second event, wherein
in a case in which the data related to the first event detected by the first detector is larger than the first size, the third processor activates the first processor and causes the first processor to transmit data related to the second event detected by the second detector to the external device.

2. The system according to claim 1, wherein
an International Mobile Equipment Identity of the first processor is different from an International Mobile Equipment Identity of the second processor.

3. The system according to claim 1, further comprising:
a second detection device integrating the second detector and the first processor that transmits the data related to the second event detected by the second detector to the external device, wherein
in a case in which the data related to the first event detected by the first detector is larger than the first size, the third processor activates the second detection device and causes the second detection device to transmit the data related to the second event detected by the second detector to the external device.

4. The system according to claim 2, further comprising:
a second detection device integrating the second detector and the first processor that transmits the data related to the second event detected by the second detector to the external device, wherein
in a case in which the data related to the first event detected by the first detector is larger than the first size, the third processor activates the second detection device and causes the second detection device to transmit the data related to the second event detected by the second detector to the external device.

5. The system according to claim 1, wherein
an International Mobile Equipment Identity of the first processor is the same as an International Mobile Equipment Identity of the second processor,
a control plane and a user plane are used in a case of communicating by IP communication, and
only the control plane is used in a case of communicating by non-IP communication.

6. The system according to claim 5, wherein
the first processor performs communication based on a Fourth Generation (4G) or a Fifth Generation (5G) standard, performing communication based on the 4G standard in a case in which the size of the data to transmit is equal to or less than a predetermined second size that is greater than the first size, and performing communication based on the 5G standard in a case in which the size of the data to transmit is greater than the second size.

7. The system according to claim 5, wherein
in a case of performing communication based on a 5G standard, the first processor varies a channel capacity by varying a strength of electric power.

8. A non-transitory computer readable medium storing a program causing a computer to execute a process for communicating,
the computer being connected to:
a first processor that communicates by IP communication;
a first detection device including
a first detector that detects a first event; and
a second processor that (i) communicates by non-IP communication for which a transmittable data size is smaller than a transmittable data size for IP communication and (ii) transmits data related to the first event detected by the first detector to an external device; and
a second detector that detects a second event,
the process comprising:
switching between communicating by IP communication and communicating by non-IP communication for which the transmittable data size is smaller than the transmittable data size for IP communication, such that communication is performed by IP communication in a case in which a size of data to transmit is greater than a predetermined first size, and communication is performed by IP communication in a case in which the size of the data to transmit is equal to or less than the first size such that, in a case in which data related to the first event detected by the first detector is larger than the first size, the first processor is activated and the first processor is caused to transmit data related to the second event detected by the second detector to the external device.

9. A system comprising:
IP communicating means for communicating by IP communication;
non-IP communicating means for communicating by non-IP communication for which a transmittable data size is smaller than a transmittable data size for IP communication;
controlling means for controlling a switching between communication by the IP communicating means and communication by the non-IP communicating means, such that communication is performed by non-IP communication in a case in which a size of data to transmit is equal to or less than a predetermined first size, and communication is performed by IP communication in the case in which the size of the data to transmit is greater than the first size;
first detection means including a first detector that detects a first event and the non-IP communicating means that transmits data related to the first event detected by the first detector to an external device; and
second detection means that detects a second event, wherein
in a case in which the data related to the first event detected by the first detector is larger than the first size, the controlling means activates the IP communicating means and causes the IP communicating means to transmit the data related to the second event detected by the second detection means to the external device.

* * * * *